Feb. 21, 1967

R. A. PETERSON 3,305,280

COMBINATION BEARING

Filed Feb. 13, 1964

INVENTOR.
REINO A. PETERSON
BY
*Owen & Owen*
ATTORNEYS 3,305,280
COMBINATION BEARING
Reino A. Peterson, Southfield, Mich., assignor to The Bunting Brass and Bronze Company, Toledo, Ohio, a corporation of Ohio
Filed Feb. 13, 1964, Ser. No. 344,574
2 Claims. (Cl. 308—35)

This invention relates to a unique combination of a rolling element bearing and a sleeve bearing, which combination achieves the advantages of both types of bearings.

Rolling element bearings including ball and roller bearings have a number of advantages including low starting torque and the ability to withstand thrust loads. Such bearings also can be made to fit precisely with no oil film clearance being necessary; further the running and static positions of the supported shaft are the same. On the other hand, rolling element bearings are expensive to manufacture and have higher running torque. These bearings also will not stand shock loading and are susceptible to fatigue failure. Rolling element bearings also have a tendency to chatter.

Sleeve bearings, on the other hand, have a number of advantages, many of which supplement the advantages of rolling element bearings. These advantages include lower cost, very long life, the ability to withstand shock loading, and low running torque. As to disadvantages, sleeve bearings tend to have high starting torque and will not withstand thrust loads. They also require an oil film clearance and the shaft may not rotate smoothly at speeds less than operating speed.

The present invention relates to a combination rolling element bearing and a sleeve bearing having most of the advantages of both, including advantages not found in either, and without most of the disadvantages. In the preferred form, the combination bearing includes a sleeve bearing located between two spaced rolling element bearings with all three receiving and rotatably supporting a rotatable shaft. The rolling element bearings rotatably support the shaft during starting and lower speeds, while the sleeve bearing takes over this function when the shaft is rotating at higher, operating speeds. The combination bearing has a much longer life than a rolling element bearing or even a sleeve bearing alone. This is made possible in part because the shaft never touches the sleeve even at low or no-speed conditions while the sleeve bearing takes the load from the rolling element bearing at higher, operating speeds. Because the rolling element bearings support the shaft so that it never touches the sleeve bearing, the type of material of which the sleeve is made is almost unlimited, as long as such material can withstand the hydrodynamic forces established during rotation of the shaft. The cost of the combination bearing also is low because lower cost materials can be used for the sleeve bearing and also because the rolling element bearings can be of lower quality, since they function only during relatively low speeds of the shaft. The combination bearing also is capable of carrying more load than is possible with either type of bearing alone, and particularly a rolling element bearing. Finally, the starting torque of the combined bearing is low because of the operation of the rolling element bearing, while the operating or running torque also is low because of the operation of the sleeve bearing.

Further in accordance with the invention, it has been discovered that in combining the two bearings, the rolling element bearing and the sleeve bearing should not be positioned concentrically. This is true because at the operating speed of a sleeve bearing, the shaft does not lie in the center of the sleeve but is displaced slightly to one side thereof because of the lubricant between the two. Consequently, if the two types of bearings are concentric, the shaft will be urged toward the eccentric position at operating speed and place an undue load on the rolling element bearings, as well as produce excessive friction and wear. It has been found that this problem can be overcome by positioning the rolling element bearings with their axes co-linear with the axis of the shaft when in the eccentric, operating position. With this arrangement, the sleeve bearing takes over the support of the shaft at operating speed without any stress placed on the rolling element bearings because of the hydraulic pressure in the oil film as a result of hydrodynamic action. At lower speeds, the rolling element bearings support the shaft and still maintain it out of metal-to-metal contact with the sleeve bearing.

It is, therefore, a principal object of the invention to provide a combination rolling element and sleeve bearing having the advantages outlined above.

Many other objects and advantages of the invention will be apparent from the following detailed description of preferred embodiments thereof, reference being made to the accompanying drawing, in which.

Figure 1:
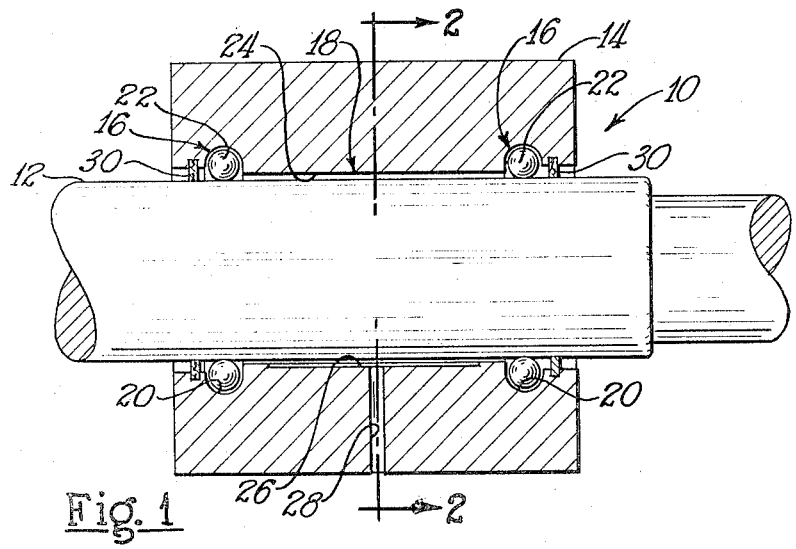
FIG. 1 is a view in vertical cross section of a combined rolling element and sleeve bearing embodying the invention.

In the drawing, the bearing components are shown in exaggerated positions and with exaggerated clearances for purposes of explanation only.

Figure 2:
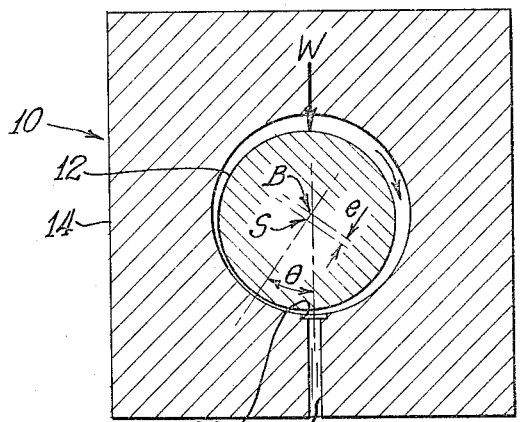
FIG. 2 is a view in transverse cross section taken along the line 2—2 of FIG. 1.

Referring to the drawing, and more particularly to FIGS. 1 and 2, a combined bearing embodying the invention is indicated by the reference numeral 10 and includes a straight shaft 12 which is rotated by any of numerous means and to which a load is applied for various purposes. The shaft extends through a bearing block 14 having spaced rolling element bearings 16 and an intermediate sleeve bearing 18. The rolling element bearings 16, in this case ball bearings, have ball races 20 ground in the bearing block 14, in which races rolling elements or bearing balls 22 are rotatably held. The sleeve bearing 18 constitutes a smooth cylindrical bore 24 of a diameter exceeding the diameter of the shaft 12 by a predetermined amount, and with oil fed between the shaft and the bore by suitable passages 26 and 28. Suitable seals 30 are located around the shaft 12 outside each of the ball bearings 16 to retain the lubricant supplied from the passages 26 and 28. The seals can be rings of neoprene rubber, for example.

The combined rolling element bearing 16 and the sleeve bearing 18 have many advantages not found with either type of bearing alone. The overall life of the combined bearing exceeds that of either the rolling element bearings 16 or the sleeve bearing 18. This result is achieved because the rolling element bearings support the shaft and the load only at low speed where wear is relatively low, while for the sleeve bearing, the shaft 12 never touches the surface of the bore 24, even when the shaft is stopped. Since the shaft and the bore never contact one another, the bearing block 14 can be made of many materials, being limited only by the characteristic that they must be capable of withstanding the hydrodynamic forces involved. Further, any tendency of the shaft to chatter when used with rolling element bearings is substantially reduced or eliminated. The cost of the combination also is less than the usual cost of the separate bearings because lower quality rolling element bearings can be used since they function only at low speeds. The combined bearing also is capable of carrying a higher load on the shaft and yet lower torque is needed both at low speeds when the rolling element bearings support the shaft, and at high speeds when the sleeve bearing supports the shaft.

Referring more particularly to FIG. 2, the shaft 12 is shown in the position it tends to assume when rotating clockwise at operating speed, and with a load W acting downwardly on the shaft. The distance between the axis B of the sleeve bearing bore 24 and the axis S of the shaft 12 is designated $e$. The location of the axis S relative to the axis B can be expressed by an angle $\theta$ formed between a line through the two axes and a vertical line through the axis B. The distance $e$ and the angle $\theta$ depend on the magnitude and direction of the load W, the magnitude and direction of the speed of the shaft, the viscosity of the lubricant between the shaft and the bore, and a bearing clearance factor. The latter is equal to 1000 times twice the radial clearance between the shaft and bore divided by the diameter of the shaft. The values of $e$ and the angle $\theta$ can be determined mathematically or graphically according to the above and as discussed more fully in "Cast Bronze Bearing Design Manual" published by Cast Bronze Bearing Institute, Inc., 1960, pages 14–17.

When the location of the axis S is determined for a given set of conditions, the bearing races 20 are machined accordingly so that the bearing balls 22 will support the shaft 12 at all times with the axis S in the position which it will tend to assume when rotating at operating speed and at the operating load. With this arrangement, the shaft will not tend to assume a different position when under operating speed as will otherwise occur if the rolling element bearings 16 support the shaft 12 with its axis concentric with the axis of the bore 24, or in any other position. Of course, the shaft 12 will never contact the surface of the bore 24, either, even when at rest.

Figure 3:
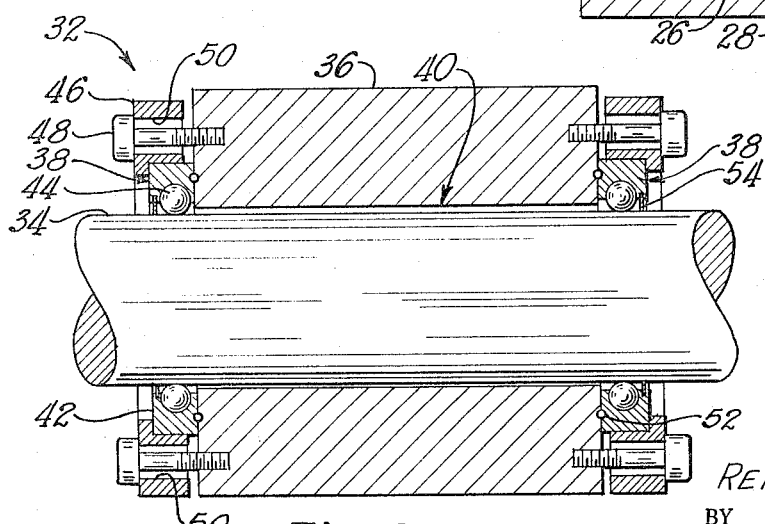
FIG. 3 is a view in longitudinal cross section of a somewhat modified combined bearing embodying the invention.

A slightly modified bearing embodying the invention is shown in FIG. 3 and is indicated by the reference numeral 32. The combination bearing 32 is basically similar to the bearing 10 but the rolling element bearings are adjustable so as to support the shaft in a variety of positions. The shaft then can be correctly positioned so that its axis S will be in the position it will normally tend to assume under operating speed, even though the load W, the speed of the shaft, or the viscosity of the lubricant may vary for different applications. Accordingly, the combination bearing 32 includes a shaft 34, a bearing block 36, rolling element bearings 38, and a sleeve bearing 40 therebetween. In this instance, the rolling element bearings 38 have races 42 which are separate from the bearing block 36 and rotatably hold bearing balls 44 outside the ends of the block 36. The races 42 are held in position by clamping rings 46 which are held against the bearing block 36 by suitable machine screws 48 extending through enlarged slots or openings 50 in the rings 46. O-rings 52 form seals between the block 36 and the races 42 while oil seals 54 are located beyond the balls 44. If different lubricants are desired for the sleeve and ball bearings, additional seals similar to the seals 54 can be used on the inner sides of the balls. Means providing an oil supply are not shown in FIG. 3.

For a particular application, after the eccentricity $e$ and the angle $\theta$ are determined, the screws 48 can be loosened and the clamping ring 46 shifted accordingly to position the rolling element bearings 38 in the proper position with the axis S of the shaft in the position which will tend to be assumed when the shaft is running at operating speed and load. Of course, various ways to adjust the rolling element bearings 38 will be apparent to those skilled in the art and it is not intended that the adjustment be limited to that shown.

Various modifications of the above described embodiments of the invention will be apparent to those skilled in the art, and it is to be understood that such modifications can be made without departing from the scope of the invention, if they are within the spirit and tenor of the accompanying claims.

I claim:
1. A combination bearing for rotatably supporting a shaft, said bearing comprising wall means forming a sleeve bearing bore, two rolling element bearings axially spaced along said bore, each of said rolling element bearings comprising a plurality of rolling elements around the entire periphery of said bore and means forming a bearing race for rotatably supporting said elements to contact and rotatably support said shaft around the periphery thereof in the same position it would otherwise tend to assume at operating speed and load without said rolling element bearings.

2. A combination bearing for rotatably supporting a shaft, said bearing comprising wall means forming a sleeve bearing bore having a diameter exceeding that of said shaft, means for supplying lubricant to said bore between said bore and said shaft, a rolling element bearing on each side of at least a portion of said bore and supported in fixed relation with respect to said bore, each of said rolling element bearings comprising a plurality of rolling elements around the periphery of said bore and means forming a bearing race for rotatably supporting said elements to contact and engage said shaft around the periphery thereof beyond said portion of said sleeve bearing bore, said bearing races positioned to support said shaft eccentrically with respect to said bore of said sleeve bearing in a position which said shaft would otherwise assume under operating speed without said rolling element bearings.

References Cited by the Examiner
UNITED STATES PATENTS

| | | | |
|---|---|---|---|
| 1,922,355 | 8/1933 | Byerlein | 308—35 |
| 2,309,397 | 1/1943 | Illmer | 308—35 |
| 3,012,827 | 12/1961 | Goetz | 308—35 |
| 3,122,399 | 2/1964 | Hunter | 308—8 |

EDGAR W. GEOGHEGAN, *Primary Examiner.*

DAVID J. WILLIAMOWSKY, *Examiner.*

N. ABRAMS, G. N. BAUM, *Assistant Examiners.*